US012191516B2

(12) United States Patent
Weiland

(10) Patent No.: US 12,191,516 B2
(45) Date of Patent: Jan. 7, 2025

(54) MOUNTING DEVICE FOR A COMPOSITE BATTERY

(71) Applicant: Maximilian Weiland, Soltau (DE)

(72) Inventor: Maximilian Weiland, Soltau (DE)

(*) Notice: Subject to any disclaimer, the term of this patent is extended or adjusted under 35 U.S.C. 154(b) by 209 days.

(21) Appl. No.: 17/556,333

(22) Filed: Dec. 20, 2021

(65) Prior Publication Data

US 2023/0050938 A1 Feb. 16, 2023

(30) Foreign Application Priority Data

Dec. 21, 2020 (EP) ..................................... 20020637

(51) Int. Cl.
*H01M 50/284* (2021.01)
*H01M 10/0525* (2010.01)
(Continued)

(52) U.S. Cl.
CPC ..... *H01M 50/284* (2021.01); *H01M 10/0525* (2013.01); *H01M 10/4257* (2013.01); *H01M 10/482* (2013.01); *H01M 10/486* (2013.01); *H01M 50/213* (2021.01); *H01M 50/269* (2021.01); *H01M 50/394* (2021.01);
(Continued)

(58) Field of Classification Search
CPC ............. H01M 10/486; H01M 10/482; H01M 10/4257; H01M 10/0525; H01M 50/581; H01M 50/569; H01M 50/51; H01M 50/394; H01M 50/269; H01M 50/213; H01M 50/284
See application file for complete search history.

(56) References Cited

U.S. PATENT DOCUMENTS

2019/0259984 A1 8/2019 Nishikawa et al.
2020/0313125 A1 10/2020 Fukuda et al.

FOREIGN PATENT DOCUMENTS

DE 10 2016 122 577 A1 5/2018
EP 2 535 789 A1 12/2012
(Continued)

OTHER PUBLICATIONS

Extended European Search Report dated Jun. 11, 2021 in European application No. 20020637.3.

*Primary Examiner* — Sarah A. Slifka
(74) *Attorney, Agent, or Firm* — Lippes Mathias LLP

(57) ABSTRACT

The invention relates to a mounting device (1) for a composite battery (7) consisting of a plurality of battery cells (71), comprising a printed circuit board (2) with electrical lines and switch elements for connecting the battery cells in parallel or series connection, a safety device with safety instruments (51) for the overcurrent protection of each battery cell, a housing with two housing parts (61, 62), having contact regions (63) for fixing the battery cells, wherein the contact regions of at least one housing part are designed as enclosures (64) for embracing a battery cell, the circuit board comprises recesses (23) for receiving and contacting (31, 32) in each case one battery cell in a respective enclosure, and wherein each recess embraces an enclosure with a battery cell in its maximum cross-sectional area. The mounting device makes it possible to provide a composite battery with exchangeable battery cells of different design, power and operating voltage in series or parallel connection with overcurrent protection at the cell level and a battery pack (8) with correspondingly configured composite batteries in a safe, simple and cost-effective manner by a user.

15 Claims, 5 Drawing Sheets

(51) Int. Cl.
*H01M 10/42* (2006.01)
*H01M 10/48* (2006.01)
*H01M 50/213* (2021.01)
*H01M 50/269* (2021.01)
*H01M 50/30* (2021.01)
*H01M 50/51* (2021.01)
*H01M 50/569* (2021.01)
*H01M 50/581* (2021.01)

(52) U.S. Cl.
CPC ......... *H01M 50/51* (2021.01); *H01M 50/569* (2021.01); *H01M 50/581* (2021.01); *H01M 2010/4271* (2013.01); *H01M 2200/103* (2013.01)

(56) References Cited

FOREIGN PATENT DOCUMENTS

| | | | |
|---|---|---|---|
| EP | 3 270 437 | A1 | 1/2018 |
| EP | 3 531 469 | A1 | 8/2019 |

MOUNTING DEVICE FOR A COMPOSITE BATTERY

BACKGROUND

The invention relates to a mounting device for a composite battery for providing different voltages and currents for a consumer from at least a battery cell, a composite battery with the mounting device as well as a battery pack with corresponding composite batteries.

Battery cells or batteries, whether in the various commercial, non-rechargeable forms as primary cells or in a usually device-specific configured, rechargeable form as accumulators or secondary cells, enable a network-independent provision of electrical energy wherever this is required and consequently a location-independent operation of electrical devices from the mobile telephone to the electrically driven vehicle.

The width of application of battery cells is accompanied by a wide variety of requirements, regarding power, energy content, shape and size, to which each energy storage used in detail has to be sufficient, wherein all commercially available battery cells are available in standardized form with regard to their decisive parameters.

A composite battery generally comprises a plurality of individual standardized battery cells, for example in the form of individual lithium round cells of the standard type 18650 and can be configured in a specific manner in terms of number and interconnection with respect to voltage, power and shaping for a particular application.

To ensure a reliable provision of electrical energy with composite batteries in particular in the case of rechargeable lithium batteries or rechargeable lithium battery packs it is necessary, to take precautions against a deep discharge and overcharging, but also to limit the current load of each cell. For this purpose, on the one hand, protective devices on the cell level and on the other hand safety devices for monitoring the function of all individual cells combined in a composite battery are used.

As such, overpressure fuses, for example in the form of predetermined breaking points within the cell cup are installed, which automatically open irreversibly from a predefined cell internal pressure and thus prevent further destruction of a battery cell. In contrast, electronic protection circuits are used for monitoring the function of a composite battery. These make it possible, on the one hand, to monitor the composite voltage and voltage differences between the individual battery cells and, upon the occurrence of impermissibly high currents, interrupt the current path in question electronically. In addition, or supplementary, in a compound battery, thermal sensors can also be provided at the same time for individually detecting the temperature of each individual cell or for the common temperature detection of a plurality of cells, each of which interacts with the electronic protective circuit in order to interrupt the current flow from the composite battery, so that overheating of the composite battery and its destruction can be prevented even more reliably. Safety devices of the type mentioned are therefore just as essential for the functional reliability of a composite battery as for safe use of each technical device operated therewith.

Accordingly, ready-made composite batteries with protective electronics, temperature monitoring, cooling and overcurrent fuses, for example for use in motor vehicles, are offered in free sale, in which the cells are firmly connected to one another by means of spot welding and in which an exchange of defective battery cells is neither provided nor readily possible for an end user for safety reasons. Composite batteries such as are used, for example, in power tools, on the other hand, usually have no cell level fuse.

However, prefabricated composite batteries also have disadvantages. Thus, in particular, it is disadvantageous with regard to the acquisition and operating costs of such composite batteries that a single defective cell in the case of cells connected in series or a defective temperature monitoring can lead to the failure of the entire cell composite, or of a rechargeable battery pack, without it being possible for an end user or user to replace the defective cell in an adequate manner or to reuse the still intact cells from the composite battery, or battery pack, of a device which is defective in this respect, such as a cordless screwdriver, laptop, e-bikes or battery lawn mower. In addition, in many composite batteries or battery packs, the individual cells are molded in a plastic matrix, so that replacement of a single cell without destruction of the composite battery or battery pack is not possible. In many cases, it is also not possible to further use the protective electronics after a single voltage loss in only one series stage since this is switched off irreversibly.

That a composite battery, because of the lack of repair capability, which is otherwise fully functional can be disposed of only in a complicated manner, is without doubt disadvantageous in terms of environmental protection.

There is therefore a need for composite batteries or battery packs which enable an exchange of defective battery cells in a simple, cost-effective and, above all, reliable manner by the end user itself. In addition to environmental reasons and a possibility of repair, it is desirable to reuse the individual cells remaining intact in a composite battery or battery pack, after a cell defect, in new composite batteries or rechargeable battery packs to be configured by the end user, specifically without special equipment and without restrictions in operational safety.

In order to adapt the provided electrical energy by a composite battery as far as possible to the respective requirement of a device to be operated therewith, it is also necessary to be able to use the individual battery cells both in series and in parallel connection.

An example of a compound battery with secondary cells, in which these are operated alternately in a series circuit and a parallel circuit by means of control electronics and conventional mechanical relays or semiconductor switches, is known from US 2008/0054870 A1.

DE 10 201 8 009 445 A1 discloses battery packs for mobile or stationary applications, in which round cells are arranged in plug modules in the form of a self-supporting holding matrix made of plastic and can be connected in parallel and/or in series by means of soldering to contact plates or, alternatively, by means of spot, laser or ultrasonic welding.

An overcurrent protection at the cell level in the form of a spot-welded connecting wire on the positive pole of a single cell, which is dimensioned in such a way that it is thermally destroyed by an increased current flow in the case of a short circuit within the cell, and thus prevents a discharge of cells connected in parallel, EP 2 416 405 A1 describes.

It is thus possible on the basis of the prior art to arrange round cells in plastic plug-in modules in a flexible manner in a composite battery or battery pack, to electrically contact the individual battery cells in a series or parallel circuit, wherein this contacting can either be carried out in a non-detachable manner, in the form of welded or soldered connections, or controlled, by means of mechanical relays or semiconductor switches, and in addition to ensure a largely safe operation of such a composite battery by the use of fuses and electronic protective circuits.

However, it is not possible for an end user to replace defective battery cells of such a composite battery in a simple, cost-effective and reliable manner, as also configure already used, still functional individual cells in a simple, cost-effective and safe manner for new applications with regard to voltage, power and shaping.

SUMMARY

The present invention is intended to provide a mounting device for a composite battery for providing different voltages and currents for a consumer which is suitable for overcoming the disadvantages of the prior art and which makes it possible for an end user to produce a composite battery or battery pack in a simple, cost-effective and reliable manner, even by using used, still functional battery cells.

The object according to the invention is achieved by the subject matter of the independent patent claims. Preferred developments are the subject matter of the dependent claims.

A first aspect of the present invention relates to a mounting device for a composite battery for providing different voltages and currents for a consumer from at least one battery cell, in particular at least one round cell of an accumulator, having electrical contacts in the form of a positive pole and a negative pole for removing the stored electrical energy. The mounting device according to the invention comprises a printed circuit board with electrical lines or conductor tracks and with switch elements for electrically connecting the at least one battery cell to the consumer and a safety device for monitoring the function of the at least one battery cell.

Furthermore, the mounting device comprises a housing for receiving a plurality of battery cells. The housing is formed in two parts, with a first housing part and a second housing part, for releasably enclosing the battery cells. According to the number of battery cells to be received in the housing, the first housing part and the second housing part each have a plurality of contact regions, which are arranged in the two housing parts such that each battery cell to be received in the housing, contacts the first and the second housing part in a respective contact region and can be fixed therebetween.

In order to enable a secure holding of the battery cells in the housing, each contact region of the first or second housing part is designed as an enclosure for receiving in each case one battery cell. Each of these enclosures is designed to at least partially enclose a battery cell received therein. To enable an even further position securing of the battery cells in the housing, all contact regions of the first and the second housing part are alternatively formed as enclosures in a corresponding manner. Each of these enclosures is also designed so that it can be received by a recess in the printed circuit board with an inserted battery cell. These recesses or milled recesses in the circuit board can, for example, be rectangular in shape, so that they enable the accommodation of a round cell in each case.

In order to electrically connect the battery cells to be held in the recesses of the circuit board in this way, each recess has a first and second contact surface. In this case, the first contact surface is provided for electrically connecting a positive pole of the battery cell and the second contact surface for electrically connecting a negative pole of the battery cell to the electrical lines or conductor tracks of the circuit board. The connections between the contact surfaces of the circuit board and the battery cells are designed to be electromechanically releasable. The mounting device according to the invention thus provides a releasable non-positive mounting for the battery cells to be received in the circuit board, which differs in a particularly advantageous manner from a conventional cell arrangement on the board by not allowing more reliable position stabilization of each individual battery cell, but also a more compact construction of a composite battery configured therewith.

The circuit board of the mounting device according to the invention can thus basically be adapted to the most varied cell shapes, cell formats or formfactors, and cell voltages or composite voltages and output currents, so that it can also be referred to as a "universal board".

For each of the battery cells, the safety device comprises a safety instrument as an electrical overcurrent fuse, by means of which in each case preferably, with regard to a space-saving circuit layout, the first contact surface is connected to the lines of the circuit board. The safety instrument thus represents protection against thermal destruction at the cell level, as it can occur in particular as a result of too rapid charging and discharging or damage to the separator after the deep discharge of a battery cell and prevents unexpected burning off of a battery cell.

A second aspect of the present invention relates to a composite battery for providing electrical energy to a consumer. Said battery cell comprises at least one battery cell with electrical contacts for removing the stored electrical energy and the mounting device according to the invention for providing different voltages and currents for a consumer from the at least one battery cell. Secondary cells in the form of rechargeable round cells or rechargeable battery cells, in particular lithium ions, are preferably provided as battery cells, as are obtainable, for example, under the type designations 18650 and 21700. With the usability of such secondary cells, the mounting device according to the invention is suitable for providing electrical energy for almost all stationary and mobile loads. The configuration of the composite battery with the mounting device according to the invention provides the end user with the possibility of securely assembling a secure composite battery with battery cells of its choice. In a likewise safe and simple manner, it is also possible for the end user to replace individual defective or spent cells of the composite battery. The composite battery configured according to the invention is therefore also distinguished by its reusability.

A further aspect of the present invention relates to a battery pack for providing electrical energy for a consumer having a plurality of the composite batteries according to the invention. As a result of the configuration of the composite batteries used with the mounting devices according to the invention, the battery pack has all the above-mentioned advantages of the mounting device or composite battery and is therefore characterized in particular by its safe and simple configurability concerning performance, voltage and shaping without special tool use by the end user. The battery pack is particularly suitable for a wide variety of uses in the consumer sector by the possibility of exchanging any defective or consumed individual cells in a simple and reliable manner, with consistently high operational reliability. The fact that the end user thus also has the possibility of reusing already used cells of other battery packs, for example from defective devices, is advantageous not only for cost reasons, but also for environmental reasons.

The battery pack according to the invention comprises a plurality of composite batteries. The individual composite batteries of the battery pack are each connected to one another in an electromechanically releasable manner via their first and second connecting socket in series connection or parallel connection. For this purpose, electrically conductive junction elements are provided, each of which can be connected to a first or a second connection socket of a composite battery. The electrical energy of the battery pack for a consumer is provided via one of the first and second connection sockets, as the compound batteries are connected by means of the junction elements. The third connection sockets of the composite batteries of the battery pack are used to monitor the function thereof and to compensate for the voltage between the individual composite batteries. For an electromechanical connection required for this purpose between the individual third connection sockets, a line element is provided, which is preferably designed as a flat ribbon cable with plugs, corresponding to the third connection sockets.

The composite batteries of the battery pack are mechanically fastened to one another in a releasable manner via the first fastening elements provided in each composite battery, which are preferably provided in the form of bores in the edge region of the housing of each mounting device. Preferably, threaded rods with nuts are used as first connecting elements. By means of the second fastening elements, which in turn are preferably provided in the edge region of each composite battery and are designed as blind bores, and second connecting elements, the composite batteries of the battery pack are releasably held in vertically or horizontally stacked association, irrespective of whether the adjacent composite batteries are opposite to the first and second housing parts or whether one of the adjacent composite batteries is assigned to the other by 180° about its longitudinal axis, so that the two composite batteries are thus opposite one another with the respective first or second housing part. For this purpose, the second connecting elements are preferably designed in the form of pins. By arranging the first and the second fastening elements in the edge region of the housing of each mounting device orthogonally and parallel to the board, it is ensured that the individual composite batteries of the battery pack are held relative to one another by means of the second connecting elements in a desired vertical and/or lateral arrangement and that a reliable force-fitting connection of all composite batteries of the battery pack to one another is ensured in a detachable manner by means of the first connecting elements.

The battery pack according to the invention is thus of modular construction and can be designed to be variable in shape and size in accordance with the number of composite batteries or mounting devices comprised. It is of particular advantage here not only that the battery pack can be adapted almost arbitrarily in its external appearance to predetermined spatial conditions, but also that it can be reliably secured in a detachable manner in virtually any position by means of the first fastening elements and first connecting elements.

Preferred embodiments of the invention result from the remaining features mentioned in the dependent claims.

Thus, it is preferred to provide the first and second contact surfaces in each of the recesses of the circuit board of the mounting device according to the invention in the form of a metallic contact spring for electrically connecting to the contacts of a battery cell. The contact surfaces designed according to the invention make it possible to electrically contact a battery cell in the mounting device by simply inserting and removing the cells, and without the risk of temperature damage, as can occur in conventional composite batteries and batteries as a result of the welding or soldering methods used in the contacting of the individual cells.

The safety instrument of the mounting device provided as overcurrent protection for each battery cell is preferably designed in the form of an electrical plug-in fuse which is electrically connected via a socket to the conductor tracks of the circuit board. In this case, the socket is not detachably connected to the lines of the circuit board, in particular by means of a rivet or screw connection. The plug-in fuse according to the invention ensures that, in the event of a short circuit in a battery cell, for example by a damaged separator, no discharge of the cells connected in the parallel connection can take place via the damaged cell and thus a burn-off of the damaged cell or of the cell composite is prevented. The preferred type of fastening of the sockets on the circuit board in particular ensures that these cannot detach from the board even in the event of a defect of a battery cell connected thereto as a result of the high temperatures occurring in the process, unlike soldered sockets. A composite battery configured with the mounting device according to the invention thus has considerable safety advantages over known composite batteries or rechargeable battery packs.

The safety instrument of the mounting device can be adapted in particular to battery cells with different power densities and are thus also designed for the use of lithium cells with very low internal resistance. With the mounting device according to the invention, it is thus also possible to configure particularly high-performance composite batteries, as are required, for example, for cordless screwdrivers. Since installation and exchange of the preferred safety instrument without special equipment of any kind are possible, the mounting device according to the invention is also distinguished by a special service- or user-friendliness. As plug-in fuses, commercially available designs of the "Mini" type blade fuse from the motor vehicle range are preferably used, which are offered for a wide variety of maximum current values and are furthermore distinguished by their high availability.

The individual safety instruments for function protection on cell level or plug-in fuses are preferably arranged in each case in the region of the positive pole of an inserted battery cell. The plug-in fuses are preferably arranged lying parallel to the surface of the printed circuit board in their longitudinal direction. This arrangement has the advantage that a visual check of the state of each individual plug-in safety instrument of the mounting device is possible without detaching the plug-in connections, that is to say already with a view of the mounting device, which in turn contributes to the particular ease of service-friendliness or user-friendliness of the mounting device according to the invention. Due to the smaller overall height of the lying arrangement of the plug-in fuses, the space requirement of the mounting device and consequently of a composite battery configured therewith is reduced in an advantageous manner. The possibility of separating between the power lines on the circuit board and the positive pole of a battery cell used in the mounting device according to the invention in the form of a separate circuit component arranged in series between them for the function protection at the cell level, enables in contrast to the devices known from the prior art, in particular good accessibility and exchangeability of the safety instrument.

In addition to a safety instrument for each battery cell, the safety device of the mounting device according to the invention has protective electronics for avoiding a deep discharge and overcharging of each battery cell. For this purpose, the protective electronics advantageously comprise a voltage balancing controller of a battery management system. Alternatively, or in combination therewith, the safety device has temperature monitoring with temperature sensors to monitor the temperature of each or individual battery cells of the composite battery during operation. For this purpose, a temperature sensor is preferably associated with each recess in the circuit board of the mounting device in order to further increase the operational reliability of a composite battery configured therewith. Particularly preferred is an arrangement of the safety device directly on the circuit board of the mounting device in electrical connection with the conductor tracks provided for this purpose, as a result of which the functional reliability of a composite battery configured with the mounting device according to the invention is ensured in a particularly user-friendly manner and without additional circuitry.

The electrical lines or conductor tracks of the circuit board of the mounting device according to the invention are preferably designed, depending on the electrical power to be transmitted, as power lines with a larger cross section or as control lines with a smaller cross section. The signal flow via the control lines preferably serves for monitoring the function and temperature of the battery cells as well as the voltage equalization between these. The power lines comprise first power lines for a series connection of the battery cells and second power lines for a parallel connection of the battery cells. Via the first bulbar, each first and second power line, which is connected to a positive pole of a battery cell, or each first and second power line, which is connected to a negative pole of a battery cell, can be electrically connected to the corresponding connection of the consumer. The busbars are preferably arranged on two opposite longitudinal sides of a large surface of the printed circuit board of the mounting device. The mounting device according to the invention thus makes it possible to provide a composite battery, the individual battery cells of which can be flexibly configured while maintaining high safety requirements, without the enormous cabling effort generally required for this purpose within the composite battery. Composite batteries and battery packs with the mounting device according to the invention are therefore not only simpler to build, but also more rapid, compared to conventional composite batteries and rechargeable battery packs, which has an advantageous effect on the production costs.

It is particularly preferred to provide the power lines in the form of the respectively first and second power lines and busbars on a first large surface of the circuit board and the control lines on a second large surface thereof. In other words: the power lines and the control lines of the mounting device according to the invention are preferably arranged on two opposite sides of the printed circuit board, or the top side and bottom side thereof. This not only allows a substantial electromagnetic, but also an immediately perceptible decoupling to a user between the two types of conductor tracks, and thus a simpler configuration and a trouble-free operation of a composite battery.

The switching elements for selectively opening and closing an electrical connection between a battery cell and the first or the second power lines are advantageously provided at junction points of the electrical lines or conductor tracks of the circuit board of the mounting device according to the invention. The junction points thus serve to select a circuit variant in which the individual battery cells of the composite battery configured with the mounting device according to the invention can be operated, or to determine the various series and parallel configurations thereof. As switching elements for electrically connecting the battery cells in the series circuit and the parallel circuit, switches and change-over switches are preferably used in the mounting device for use in the form of electromechanical switches such as plug-in bridges with plug sockets, solder bridges, relays and/or electronic switches.

Particularly preferred switches are plug-in bridges with plug sockets for producing a detachable electrical connection or solder bridges for producing a non-detachable electrical connection. The plug sockets used with the plug-in bridges are each firmly connected to the electrical lines of the circuit board. With regard to a low transition resistance, it is advantageous to design the plug sockets at the individual junction points with multiple contacts for each circuit alternative and to produce the electrical connection in each case via plug-in bridges with corresponding multiple contacts.

By way of example, a plug-in bridge with four contacts can be provided in a linear arrangement, by means of which in each case two of three lines on the circuit board can be connected to the line ends via two correspondingly spaced socket contacts in order to prepare the mounting device according to the invention for a series or parallel connection of the battery cells to be received. The line layout on the circuit board ensures that one line end is to be connected to in each case only one of the two other line ends by means of the plug-in bridge. For this purpose, three plug socket contacts are provided at the line end, via which the connection to the two other line ends is to be established, and two socket contacts are provided on each of the two other line ends. The line end with the three socket contacts is provided in the form of a right angle with a socket contact at the angle tip and in each case a socket contact in the two angle legs for interaction with in each case two of the four plug-in bridge contacts. The one of the two line ends with in each case two socket contacts is formed in a straight line to the angle leg forming the line end and can be configured by means of the plug-in bridge for the series connection of the battery cells. The other of the two line ends is formed in a straight line with the other angle leg and can be configured by means of the plug-in bridge for the parallel connection of the battery cells. By virtue of the design of the plug contacts according to the invention, short circuits as a result of impermissible line connections in the configuration of a composite battery by means of plug-in bridges are reliably excluded by a user.

The mounting device thus makes it possible to change between series connection and parallel connection of the individual battery cells to be received in a simple, cost-effective and reliable manner and without special effort, such as the use of welding devices and/or special tools. If electronic switches or electronically controllable switches are used instead of the plug-in or solder bridges, the individual circuit variants can be produced in a particularly simple manner even when the housing of a composite battery configured with the mounting device is closed. In this case, the electronic switches are controlled by setting elements on the outside of the housing or via the third connection socket by means of the protective electronics encompassed by the mounting device, which in a particular embodiment is additionally also designed to control the electronic switches.

A particular advantage of the mounting device is that, as a result of this layout of the circuit board according to the invention, the number of required switching elements for any desired voltage configurations of a composite battery configured with the mounting device is limited as follows:

Number of switching elements=2×[(Number of battery cells)−1]

provided that the corresponding switching elements are designed as changeover switches according to the interconnection logic described above.

By means of the circuit concept according to the invention with plug-in bridges, electronic switching elements and/or solder bridges, it is thus possible for an end user to set a desired circuit variant of the battery cells of a composite battery independently in a simple and intuitive manner and to adapt a compound battery at any time for further uses.

Furthermore, it is preferred to provide connection sockets on the circuit board of the mounting device according to the invention which can be electrically connected to the battery cells to be received by the mounting device via the busbars in order to provide the electrical energy stored therein to a consumer. For this purpose, a first connection socket is electrically connected to the first contact surfaces via the first busbar and a second connection socket is electrically connected to the second contact surfaces via the second busbar. The electrical connections are here preferably designed to transmit continuous currents of up to 35 A. As already indicated, the first busbar, and consequently the first connection socket, can preferably be connected via the power lines and the first contact surfaces to the positive poles of the battery cells to be received by the mounting device, while the second busbar, and consequently the second connection socket, can be connected to the negative poles of the battery cells to be received by the mounting device via the power lines and the second contact surfaces. In addition, a third connection socket for functional monitoring of the protective electronics and for voltage equalization between the individual composite batteries, also referred to as balancing, is preferably provided. This balancing/data connection, together with the two high-current connections, forms the interfaces of a composite battery configured with the mounting device according to the invention.

Each contact region composed of the first and second housing parts of the mounting device preferably has an opening in the region of the cell cup. These openings thus enable direct heat dissipation from the battery cells fixed between the contact regions of the first and second housing parts. However, in particular when using the mounting device in a moist environment, it may also be advantageous to dispense entirely with these openings. Sufficient heat dissipation in this case is preferably ensured by suitable dimensioning of the interior of the housing of the mounting device and/or a housing material with good thermal conductivity, such as aluminum.

Furthermore, it is preferred to design the first and second housing parts in each case in such a way that the circuit board with the battery cells is at least partially enclosed on the first or second large surface of the circuit board. In this case, the second housing part is either fixedly connected to the circuit board, for instance releasable by means of a screw connection or non-detachably by means of an adhesive connection, while the first housing part is detachably and non-positively connected to the second housing part and/or the circuit board in a releasable manner, for example by means of snap-action elements. Alternatively, it is preferable for the circuit board to be detachably fastened indirectly via frictional engagement, holding pins and/or snap-action elements between the first and the second housing part.

The connection sockets mounted on the printed circuit board are preferably accessible via notches in the seam region of the two housing parts and are fixed indirectly to the connecting elements provided between them in accordance with the battery cells in the mounting device.

Advantageously, the contact points between the first and second housing parts and between each of these housing parts and the battery cells and connection sockets to be received therein are provided with a respective circumferential elastic sealing region, for example made of silicone, against the penetration of dust and spray water.

The first and second housing parts of the mounting device each have a peripheral edge region on the side facing away from the printed circuit board, which edge region projects beyond the battery cells to be inserted in its height and thus enables a secure resting on a flat base or the edge region of a first or second housing part of a correspondingly designed further mounting device with battery cells inserted therein or a corresponding further compound battery.

Each of these edge regions preferably has recesses or edge region openings in order to ensure heat dissipation and thus a cooling of the battery cells to be received in the mounting device according to the invention or a composite battery configured therewith during operation.

Furthermore, it is preferred to design the first and/or second housing part on the side facing the printed circuit board with a venting device in order to cool the hot gas released during a thermal defect from a battery cell with high pressure to such an extent that, upon contact with the oxygen of the ambient air, a risk of fire and consequently damage to the mounting device can be reliably prevented. Optionally, the venting device in each of the tubular cavities comprises a flame arrester in an indentation.

For this purpose, the venting device comprises a tubular cavity with at least one inlet on the inner side of the housing facing the circuit board and with at least one outlet on the outer side of the housing facing away from the circuit board. The tubular cavity thus forms, in addition to the interior space of the housing which is delimited by the two housing parts, with the circuit board, a housing region which is separate therefrom and which, on the one hand, is connected to the interior of the housing of the circuit board via the at least one inlet and, on the other hand, to the housing environment via the at least one outlet.

In this case, it is particularly preferred to provide the venting device along one of the two longitudinal sides of the housing or circuit board and to form the partition wall between the interior of the housing with the circuit board and the outer wall of the housing in the form of two corresponding partial walls in the first and second housing parts, which in their longitudinal extent rest against one another when the mounting device is used and comprise the at least one inlet. Advantageously, the housing of the mounting device is made of a heat-resistant plastic or of aluminum. The various embodiments of the invention mentioned in this application can advantageously be combined with one another.

BRIEF DESCRIPTION OF DRAWINGS

The invention is explained in detail below in exemplary embodiments with reference to the accompanying drawings, in which.

DETAILED DESCRIPTION

Figure 1:
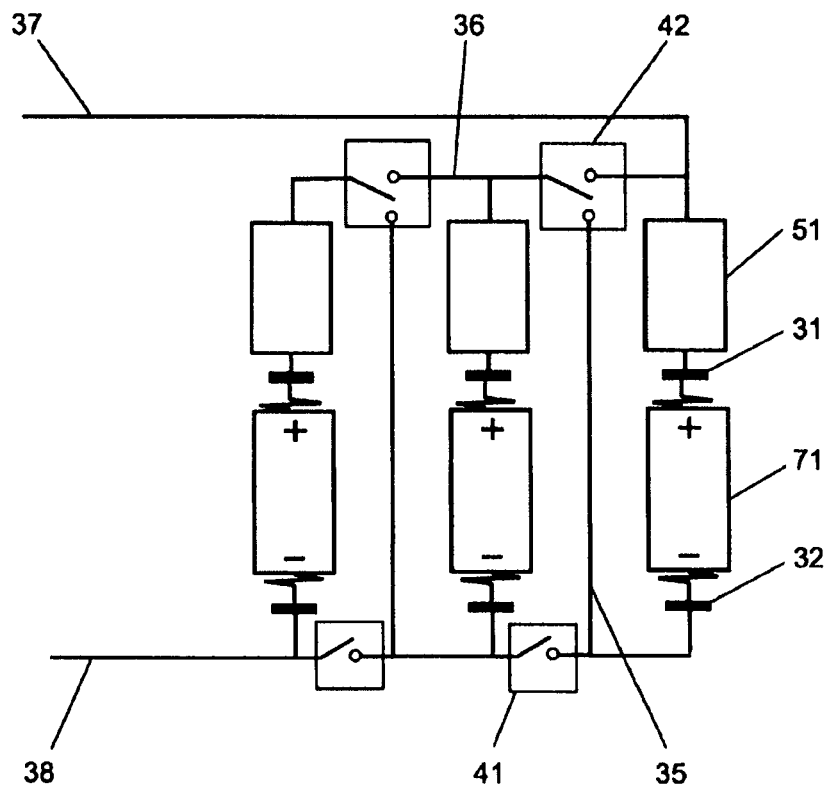
FIG. 1 shows a circuit diagram of a composite battery with individual cells secured to the cell level for selective operation in a parallel circuit or in a series circuit according to the invention.

FIG. 1 shows a circuit diagram of a composite battery 7 configured with the mounting device 1 according to the invention. For selective operation of the battery cells 71 of the composite battery 7 in a series circuit or in a parallel circuit, each battery cell 71 is electrically connected at its positive pole via a first contact surface 31 and a fuse device 51 for overcurrent protection by means of second power lines 36 and changeover switches 42 to a first busbar 37. Via a second contact surface 32, each battery cell 71 is electrically connected at its negative pole by means of second power lines 36 and switch 41 to a second busbar 38. The electrical energy provided in this way is to be discharged through a consumer via the first and second bus bars 37, 38.

Figure 2:
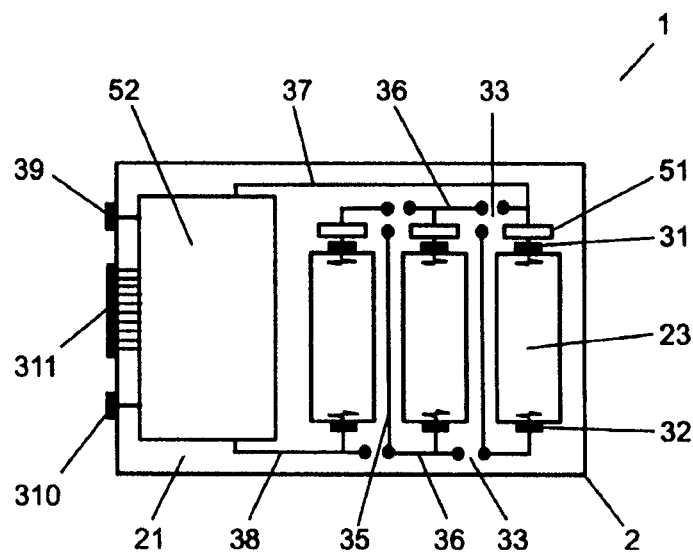
FIG. 2 shows a mounting device for a composite battery according to the invention according to FIG. 1 in front view without a housing.

FIG. 2 shows a front view of the mounting device 1 according to the invention for a composite battery 7 without a housing. In the embodiment shown, the first large surface 21 of the printed circuit board 2 composed of the mounting device 1 has three recesses 23 with respectively associated first and second contact surfaces 31, 32 in the form of electrically conductive spring contacts. In each case in the direct electrical connection with the first contact surface 31, an overcurrent protection is provided via a safety instrument 51 in the form of a plug-in blade fuse that is detachably inserted in a socket. A second power line 36 leads from the socket of the safety instrument 51 to a junction point 33. This comprises contact surfaces for electrical connection to a switch element in the form of a changeover switch 42 for an alternative connection of battery cells 71 to be received in the recesses 23 in a parallel circuit via the second power lines 36 or in a series circuit via the second power lines 36 and first power lines 35. The positive pole of the battery cells 71 connected in series can thus be connected via the second power lines 36 and a first busbar 37 to the corresponding input of a protective electronics 52 comprised by the safety device on the first large surface 21 of the circuit board 2 encompassed by the mounting device 1, while the negative pole of the battery cells 71 connected in series can be connected to the corresponding input of the protective electronics 52 via the second power lines 36 and a second busbar 38. The mounting device 1 according to the invention is connected to a consumer via a first and second connection socket 39, 310, which are connected via the protective electronics 52 to the first busbar 37 or second busbar 38. Access to the protective electronics 52 for functional monitoring and for control purposes is made possible via a third connection socket 311.

Figure 3:
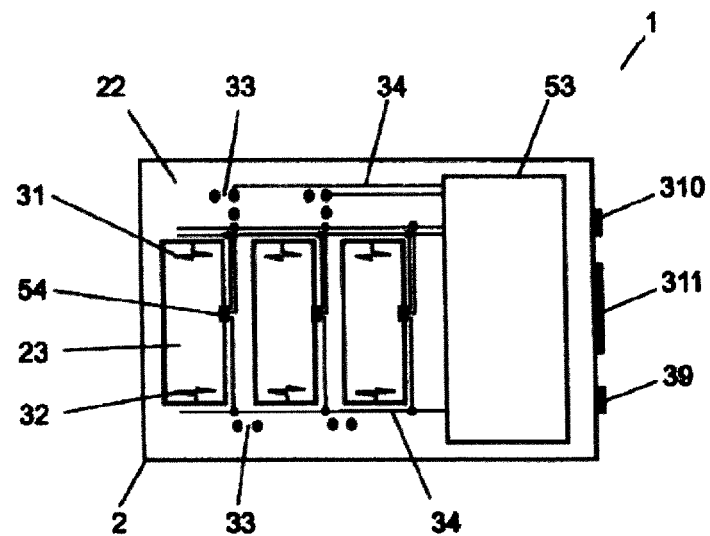
FIG. 3 shows the mounting device according to FIG. 2 in a rear view.

FIG. 3 shows the rear view of the mounting device 1 according to the invention shown in FIG. 2 without a housing. A temperature sensor 54 for monitoring the temperature of the battery cell 71 to be received in a recess 23 is arranged on each of the three recesses 23 on the second large surface 22 of the circuit board 2 which is part of the mounting device 1. Each temperature sensor 54 is electrically connected via control lines 34 to a temperature monitor 53 for detecting the cell temperature. In the illustrated embodiment, the temperature monitoring 53 is arranged as a separate circuit element on the second large surface 22 of the circuit board 2, wherein on the one hand an access to the temperature monitoring 53 and, on the other hand, an operative connection with the protective electronics 52 on the first of the large surface 21 of the printed circuit board 2 exists via the third connection socket 311. The electrical connections required for this purpose are designed as control lines 34; however, an arrangement of the temperature monitoring 53 on the first large surface 21 of the circuit board 2 with corresponding vertical interconnect access of the control lines 34 is likewise possible and represents an equally preferred alternative. In both cases, the safety device of the mounting device 1 according to the invention comprises battery management system 52, a temperature monitoring 53, safety instrument 51 and temperature sensors 54.

Figure 4A:
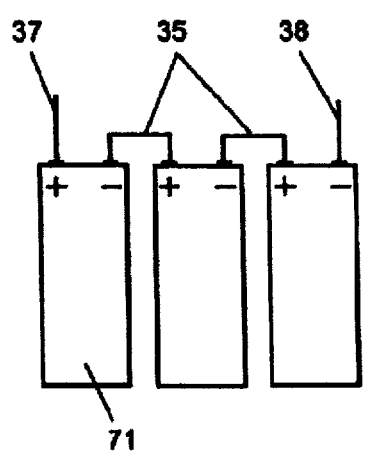
FIG. 4A shows a schematic representation of the series circuit of the individual cells according to FIG. 1.

The embodiment of the mounting device 1 according to the invention shown in FIGS. 2 and 3 is thus electrically connected to one another for a series arrangement with three battery cells 71, corresponding to the schematic representation according to FIG. 4A via two first power lines 35. The connection to a consumer is possible via the first busbar 37 connected to the positive pole of the series circuit and via the second busbar 38 connected to the negative pole of the series circuit.

Figure 4B:
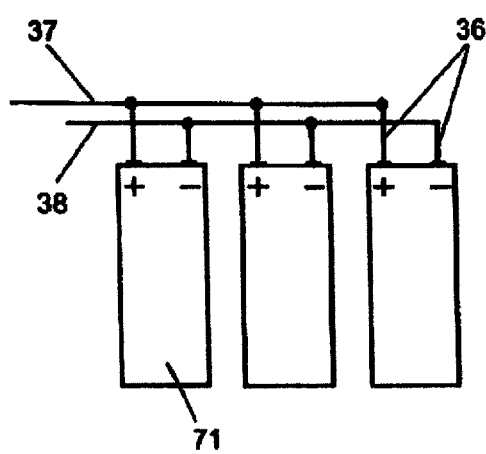
FIG. 4B shows a schematic representation of the parallel connection of the individual cells according to FIG. 1.

FIG. 4B shows the three battery cells 71 in a parallel arrangement. In this case, the positive poles of the battery cells 71 are each electrically connected to the first busbar 37 via second power lines 36, while the negative poles are electrically connected to the second busbar 38 for connection to the consumer.

Figure 5:
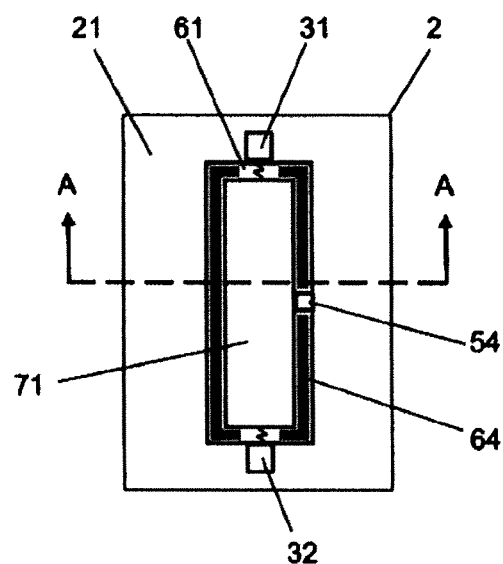
FIG. 5 shows a detail of a mounting device according to FIG. 2 with a battery cell and an enclosure of a second housing part in a circuit board.

A section of a mounting device 1 in top view according to FIG. 2 is shown schematically in FIG. 5. A battery cell 71 inserted into the mounting device 1 is in this case partially kept in an enclosure 64 of a first housing part 61 made of plastic and a rectangular recess 23 in a printed circuit board 2. The battery cell mechanically held in this way is additionally electrically connected to the conductor tracks (not shown) on the circuit board 2 via a first and a second contact surface 31, 32. The battery cell 71 is a round cell of the standard type 18650.

Figure 6:
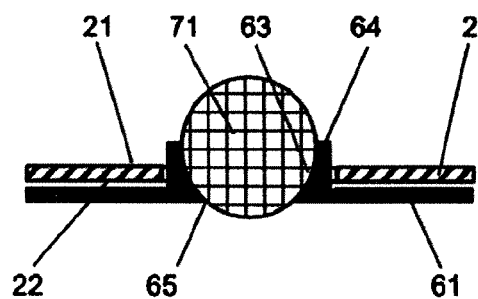
FIG. 6 shows the section of the mounting device with the battery cell and the second housing part with the enclosure according to FIG. 5 in section A-A.

FIG. 6 shows the detail of the mounting device 1 in a schematic sectional view along the section line A-A in FIG. 5. The first housing part 61 is fixedly connected to the printed circuit board 2 by means of an adhesive connection in the illustrated embodiment. The enclosure 64 penetrates the circuit board 2 and projects beyond it, whereby on the one hand a defined assignment of the first and second contact surfaces 31, 32 (not shown) on the circuit board 2 to the electrical contacts 72 (not shown) of the battery cell 71 (not shown) is ensured and, on the other hand, a cooling surface in the form of the enclosure 64 for the battery cell 71 is provided. The battery cell 71 rests flat against the contact region 63 of the first housing part 61 encompassed by the enclosure 64. Further cooling of the battery cell 71 is made possible by an opening 65 in the contact region 63.

Figure 7A:
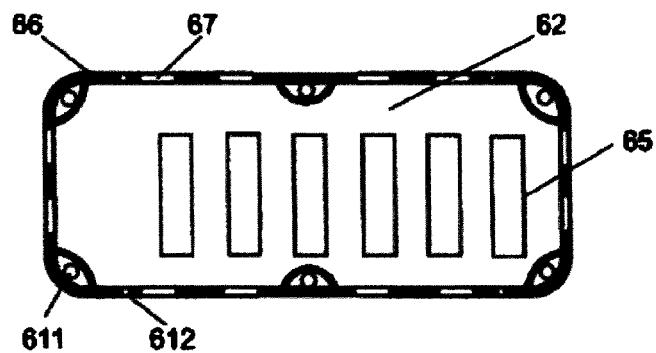
FIG. 7A shows a schematic illustration of a composite battery according to the invention with six battery cells with) an associated first housing part.
Figure 7B:
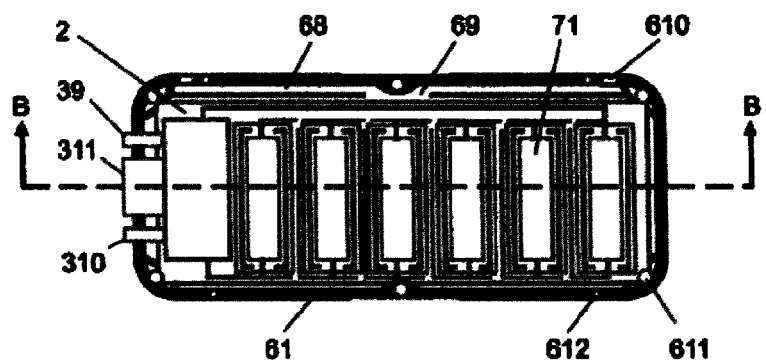
FIG. 7B shows a schematic illustration of a mounting device corresponding to FIG. 2 with six battery cells in a second housing part.
Figure 7C:
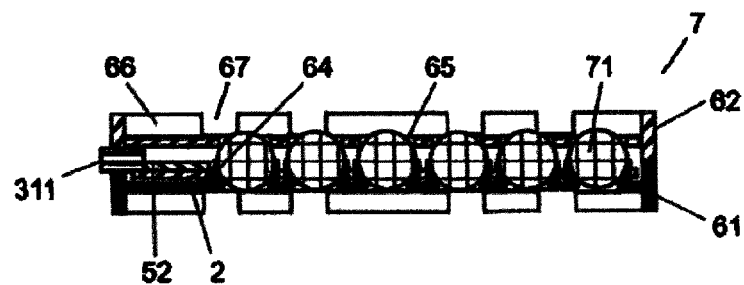
FIG. 7C shows a schematic representation of the composite battery according to FIG. 7A and FIG. 7B in section taken generally along the lines B-B of FIG. 7B.

FIG. 7 shows a composite battery 7 according to the invention with six battery cells 71 of standard type 18650 in three schematic views. In top view, FIG. 7A shows an associated second housing part 62 and FIG. 7B an associated first housing part 61 with a mounting device 1 according to FIG. 2 and the six battery cells 71. FIG. 7C shows the composite battery 7 with the second housing part 62 according to FIG. 7A and the first housing part 61 according to FIG. 7B in section B-B. The two housing parts 61, 62 are here formed as injection-molded parts made of a heat-resistant plastic.

FIG. 7A shows the second housing part 62 with six openings 65 for heat dissipation in the contact regions 63 of the battery cells 71 in a top view and consequently an outer side of the composite battery 7. For a screw connection to the first housing part 61, first fastening elements 611 in the form of bores are formed in the corners and in the two longitudinal edge region walls. These wall sections also comprise second fastening elements 612 as blind bores for releasably receiving second connecting elements 82 in the form of pins. The first fastening elements 611 are limited by internal wall regions in the form of a circular segment for reasons of stability. Furthermore, edge region opening 67 in the longitudinal edge walls are each formed between the first and second fastening elements 611, 612. These ensure that the heat emitted by the battery cells 71 via the openings 65 during operation of the composite battery 7 can be reliably dissipated even when the composite battery 7 rests on a flat surface or is used stacked in a battery pack 8 with a plurality of composite batteries 7.

FIG. 7B shows the inner side of the first housing part 61 of the composite battery 7. The edge wall of the first housing part 61 is congruent with that of the second housing part 62 and comprises first and second fastening elements 611, 612 in a corresponding arrangement for releasable connection to the second housing part 62 via the aforementioned first and second connecting elements 81, 82. In addition, a venting device 68 in the form of a tubular cavity with an inlet 69 on the inner side of the first housing part 61 facing the circuit board 2 and with two outlets 610 in the edge wall is formed along one of the two longitudinal edge walls. In the illustrated embodiment, the tubular cavity of the venting device 68 is thus vertically delimited by the partition with the inlet 69 and the opposite edge wall with the two outlets 610, while the lateral boundary is affected by a respective partial region of the base surface of the first housing part 61 and of the second housing part 62. In addition to the two outlets 610, three notches for the first, second and third connecting sockets 39, 310, 311 of the composite battery 7 are also formed in the edge wall of the first housing part 61, which notches are dimensioned in such a way that dust and splash water protection of the housing interior is ensured in the operating state of the composite battery 7, wherein each of the three connection sockets 39, 310, 311 also bears against the corresponding edge wall of the second housing part 62. The contact regions 63 in the first housing part 61 are shaped as enclosures 64 in order to stabilize the position of the battery cells 71 resting thereon, which penetrate the recesses 23 in the printed circuit board 2 and enclose half of the lateral surface of each battery cell 71. On the end face, each of the enclosures comprises a notch for the first and second contact surfaces 31, 32 provided on the printed circuit board 2 for making electrical contact with the battery cells 71, which are designed as spring contacts. In this embodiment of the composite battery 7 according to the invention, the printed circuit board 2 is firmly bonded to the inner side of the first housing part 61 and is formed in accordance with FIGS. 2 and 3. Instead of the three recesses 23 shown in FIGS. 2 and 3, the circuit board 2 here has six recesses 23, each of which encloses a battery cell 71 in an enclosure 64.

In FIG. 7C, the composite battery 7 with the second housing part 62 according to FIG. 7A and the first housing part 61 according to FIG. 7B is shown schematically in section B-B. The releasable connection between the two housing parts 61 and 62 is effected here by screws which are attached as first connecting elements 81 in the bores provided for this purpose as first fastening elements 611.

Figure 8:
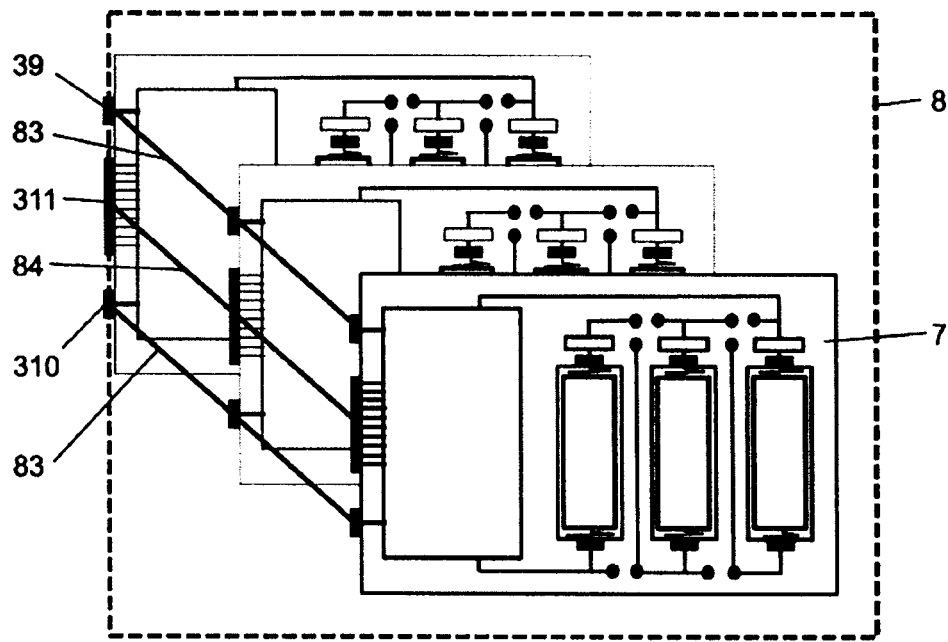
FIG. 8 shows a schematic illustration of an electrical interconnection of three mounting devices according to FIG. 2 of a battery pack according to the invention.

FIG. 8 schematically shows the electrical interconnection of three composite batteries 7 with in each case one mounting device 1 according to the invention corresponding to FIG. 2 and three battery cells 71 in a parallel arrangement to form a battery pack 8. For the parallel connection of the three composite batteries 7 of the battery pack 8 according to the invention, all the first connection sockets 39 and all the second connection sockets 310 are each connected in an electromechanically releasable manner to one another. For this purpose, the first and second connection sockets 39, 310 are each preferably formed as threaded pins and screwed together by means of a respective junction element 83 in the form of an electrically conductive metal bridge with three corresponding bores. The connection to a consumer takes place via one of the first connection sockets 39 and one of the second connection sockets 310 of the three composite batteries 7 in turn by means of a releasable screw connection. This preferred type of electromechanical connection of the individual composite batteries 7 of the battery pack 8 also permits reliable electrical contacting even in the case of a possible heating of the connection sockets. The function monitoring of the battery pack 8 and a voltage equalization between the individual composite batteries 7 is made possible via the third connection socket 311 provided in each of the three composite batteries 7. For this purpose, the third connection sockets 311 are connected to a line element 84 in the form of a ribbon cable.

Figure 9:
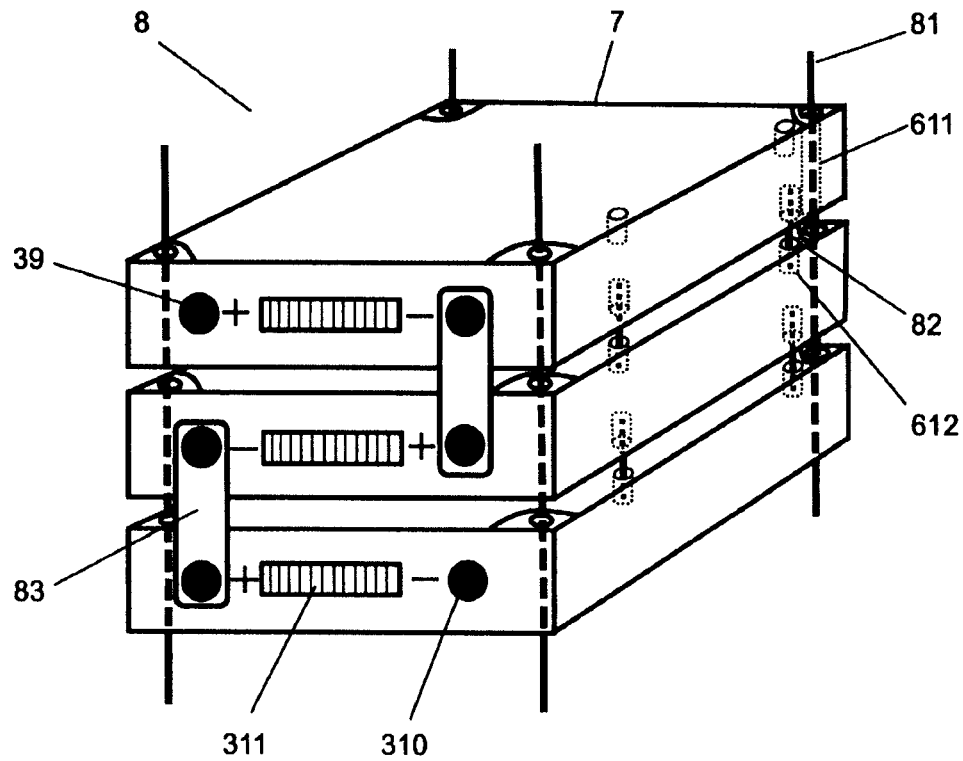
FIG. 9 shows a schematic external view of a battery pack according to the invention with three composite batteries in series connection.

Finally, FIG. 9 shows a rechargeable battery pack 8 with three composite batteries 7 in series in its schematic, reproduced external appearance. The first and second housing parts 61, 62 of each individual composite battery 7 are closed here, without openings 65 in the region of the battery cells 71, made of aluminum die casting. The electrical connection of the three composite batteries 7 in series connection is effected by two junction elements 83. In this exemplary embodiment, each of these junction elements 83 is designed as an electrically conductive metallic bridge with two bores. The first and second connection sockets 39, 310 of the three composite batteries 7 are preferably designed as threaded pins. The first connection socket 39 of the first composite battery 7 and the second connection socket 310 of the second composite battery 7 arranged thereon in the illustration are screwed to one another via the first of the two junction elements 83, while the first connection socket 39 of the second composite battery 7 and the second connection socket 310 of the third composite battery 7 arranged thereon in the illustration are connected to one another in an electromechanically releasable manner by means of the second junction element 83. The connection to an external consumer takes place in this case via the second connection socket 310, or the negative pole, of the first composite battery 7 and the first connection socket 39, or the positive pole, of the third compound battery 7. Functional monitoring of the battery pack 8 and a voltage equalization between the individual composite batteries 7 are again made possible via the third connection sockets 311 provided in each of the three composite batteries 7.

Each of the three composite batteries comprises a mounting device 1 according to the invention with a printed circuit board 2 and a first, second and third connection socket 39, 310, 311 according to FIG. 2 and a housing with a first and a second housing part 61, 62 corresponding to FIG. 7. The two housing parts 61, 62 are made of plastic and each have an opening 65 for heat dissipation in the contact region 63 of a battery cell 71. Each of the battery cells 71 is partially enclosed in the interior of the housing for position stabilization by an enclosure 64, which in turn is surrounded by a recess 23 in the circuit board 2. The enclosures 64 are each formed in the first housing part 61. The first and second housing parts 61, 62 and the printed circuit board 2 of each composite battery 7 have first fastening elements 611 in the form of bores in the corners. In addition, the two housing parts 61, 62 of each composite battery 7 on the outside in the edge region of their large surfaces in perpendicular arrangement to the printed circuit board 2 each comprise a plurality of second fastening elements 612 in the form of blind holes. Second connecting elements 82 in the form of spacer pins are detachably mounted in the blind holes. In this way, the composite batteries 7 of the battery pack 8 are kept at a distance in the desired lateral assignment. In conjunction with the openings 65 in the first and second housing parts 61, 62, sufficient cooling of the battery cells 71 during operation of the battery pack 8 is thus ensured. The three composite batteries 7 are releasably clamped against each other in their vertical arrangement by a first connecting element 81 in the form of a threaded rod in the bores in the corners of the individual housings by means of nuts. At the same time, both the battery cells 71 and the first, second and third connection socket 39, 310, 311 of the individual composite batteries 7 are thereby fixed between the associated first and second housing parts 61, 62 and the housing interior space is protected against dust and spray water.

LIST OF REFERENCE NUMBERS

1 Mounting device
2 Printed circuit board
21 First large surface
22 Second large surface
23 Recess
31 First contact surface
32 Second contact surface
33 Junction point
34 Control line
35 First power line
36 Second power line
37 First busbar
38 Second busbar
39 First connection socket
310 Second connection socket
311 Third connection socket
41 Switch
42 Changeover switch
51 Safety Instrument
52 Protective electronics
53 Temperature monitoring
54 Temperature sensor
61 First housing part
62 Second housing part
63 Contact region
64 Enclosure
65 Opening
66 Edge region
67 Edge region opening
68 Venting device
69 Inlet
610 Outlet
611 First fastening element
612 Second fastening element
7 Composite battery
71 Battery cell
72 Electrical contact
8 Battery pack
81 First connecting element
82 Second connecting element
83 Junction element
84 Line element

The invention claimed is:

1. A mounting device for a composite battery for providing different voltages and currents for a consumer from at least one battery cell having electrical contacts for removing the stored electrical energy, said mounting device comprising;
a printed circuit board with electrical lines and switching elements for electrically connecting the at least one battery cell to the consumer,
a safety device for monitoring the function of the at least one battery cell,
a housing for receiving a plurality of battery cells comprising a first housing part and a second housing part,
wherein each first and second housing part comprises a plurality of contact regions, wherein each battery cell can be fixed between in each case at least one contact region of the first and second housing part, wherein each contact region in the first and/or second housing part is designed as an enclosure for receiving in each case one battery cell, and wherein each enclosure is designed for at least partially enclosing a battery cell that can be accommodated therein;
wherein the printed circuit board comprises a plurality of recesses for receiving in each case one enclosure with a battery cell, wherein each recess comprises a first contact surface for electrically connecting a positive pole of a battery cell and a second contact surface for electrically connecting a negative pole of the battery cell to the electrical lines, wherein in each case one of the contact surfaces is electrically connected to the electrical lines of the printed circuit board via the safety device, wherein the safety device comprises a safety instrument for each battery cell for electrical overcurrent protection,
wherein each battery cell in one of said enclosures is electrically connectable to the printed circuit board in a releasable manner via the respective first and second contact surfaces, and wherein each recess in the printed circuit board is dimensioned such that a battery cell can be enclosed in one of said enclosures in a maximum cross-sectional area of the battery cell.

2. The mounting device according to claim 1, wherein each first and second contact surface is formed in the form of a metallic contact spring.

3. The mounting device according to claim 1, wherein the safety instrument comprises an electrical plug-in fuse and a socket in releasable connection, and wherein the socket is electrically connected to the electrical lines of the printed circuit board in a non-detachable manner.

4. The mounting device according to claim 1, wherein the safety device comprises protective electronics for avoiding a deep discharge and overcharging of each battery cell and/or a temperature monitoring for the at least one battery cell with at least one temperature sensor.

5. The mounting device according to claim 1, wherein the safety device is arranged on the printed circuit board in electrical connection with the electrical lines.

6. The mounting device according to claim 1, wherein the electrical lines of the printed circuit board comprise:
control lines for the functional monitoring of the at least one battery cell and for the voltage equalization between the battery cells, a plurality of first power lines for a series connection of the battery cells, a plurality of second power lines for a parallel connection of the battery cells, a first busbar for establishing an electrical connection between the positive pole of at least one battery cell and the consumer, and a second busbar for establishing an electrical connection between the negative pole of at least one battery cell and the consumer.

7. The mounting device according to claim 6, wherein the first and second power lines are arranged on a first large surface of the printed circuit board and the control lines are arranged on a second large surface of the printed circuit board.

8. The mounting device according to claim 6, wherein the switching elements are provided for opening and closing the electrical connection between at least one battery cell and the first power lines or the second power lines at junction points of the electrical lines of the printed circuit board.

9. The mounting device according to claim 8, wherein the switching elements are provided for electrically connecting the battery cells in the series circuit and the parallel circuit, -wherein the switching elements comprise:
at least one electromechanical switch, a solder bridge or a relay, and/or at least one electronically controllable switch.

10. The mounting device according to claim 8, wherein the printed circuit board, in each case in electrical connection with the junction points, comprises a first connection socket and a second connection socket in electrical connection with the second busbar for providing the electrical energy of the composite battery, and a third connection socket for functional monitoring of the protective electronics and for voltage balancing.

11. The mounting device according to claim 1,
wherein each contact region in the first and/or the second housing part has an opening, wherein the first housing part at least partially encloses the printed circuit board with the battery cells on a first large surface of the printed circuit board,
wherein the second housing part at least partially encloses the printed circuit board with the battery cells on a second large surface of the printed circuit board,
wherein the second housing part is fixedly or detachably connected to the printed circuit board, and wherein the first housing part is detachably connected to the second housing part and/or to the printed circuit board.

12. The mounting device according to claim 1,
wherein the first and second housing parts each have a circumferential edge region on the side facing away from the printed circuit board, which edge region, at its height, projects beyond the battery cells to be received by the mounting device and is formed in each case with a plurality of edge region openings, and
wherein the first and/or second housing part comprises, on the side facing the printed circuit board, a venting device for controlled pressure reduction in the event of a thermal destruction of a battery cell received by the mounting device,
wherein the venting device is designed as a tubular cavity with at least one inlet on an inner side of the housing facing the printed circuit board and with at least one outlet on an outer side of the housing facing away from the printed circuit board.

13. The mounting device according to claim 1, wherein the housing has first, second and third connection sockets and first and second fastening elements for fastening the mounting device.

14. A composite battery for providing electrical energy for a consumer, comprising at least one battery cell having electrical contacts for removing the stored electrical energy, wherein
a mounting device for providing different voltages and currents for a consumer from at least one battery cell according to claim 1 is provided.

15. A battery pack for providing electrical energy for a consumer, wherein the battery pack comprises a plurality of composite batteries according to claim 14 for providing the electrical energy for the consumer,
wherein the plurality of composite batteries are mechanically fastened to one another via first fastening elements provided in each composite battery and first connecting elements and are held detachably in vertically or horizontally stacked arrangement by second fastening elements provided in each composite battery via second connecting elements,
wherein the battery pack can be fastened in a force-fitting manner via the first fastening elements and the first connecting elements,
wherein the plurality of composite batteries is electrically connected to one another via first and second connection sockets provided in each composite battery via junction elements in series connection or parallel connection,
wherein one of first and second connection sockets of the plurality of composite batteries is provided for providing the electrical energy of the battery pack for the consumer, and
wherein a third connection socket is provided in each of the plurality of composite batteries that can be connected for function monitoring and for voltage equalization via a line element.

* * * * *